Patented June 6, 1950

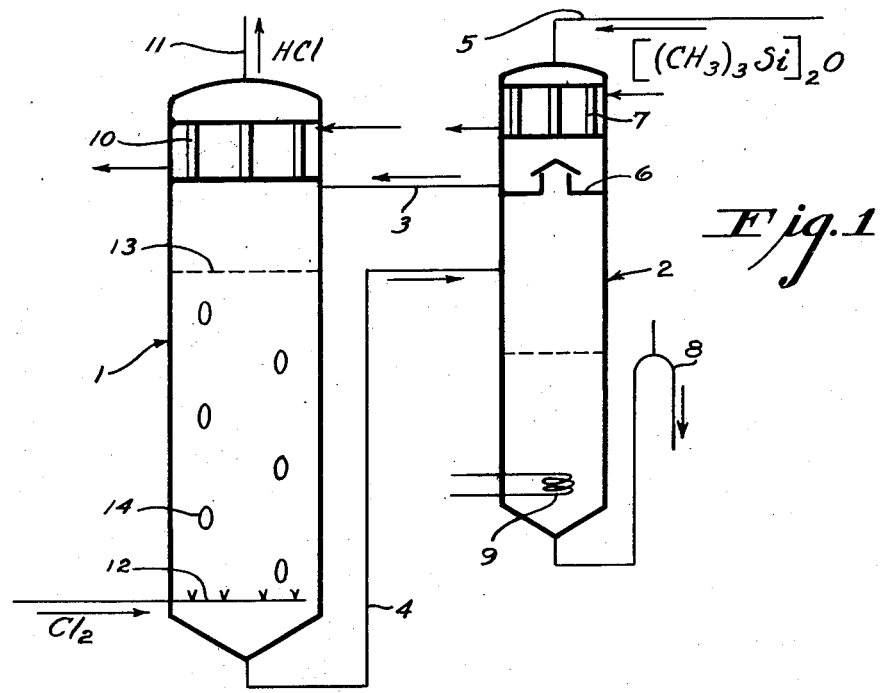
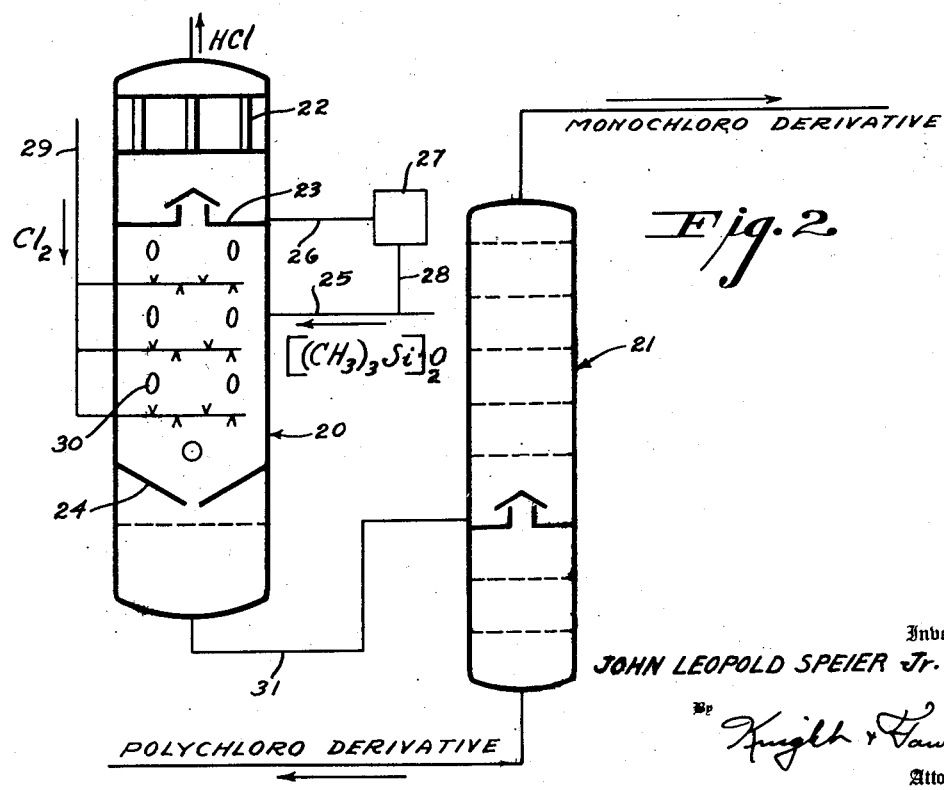

2,510,148

UNITED STATES PATENT OFFICE 2,510,148

CHLORINATION OF ORGANOSILICON COMPOSITIONS

John Leopold Speier, Jr., Pittsburgh, Pa., assignor to Corning Glass Works, Corning, N. Y., a corporation of New York Application February 10, 1947, Serial No. 727,629

3 Claims. (260—448.2)

The present invention relates to the production of organosilicon materials which contain chlorine substituents in the organic radicals.

Rob Roy McGregor and Earl Leathen Warrick have disclosed in their copending application Serial No. 647,395, filed February 13, 1946, and assigned to the same assignee as the present invention, the chlorination of hexamethyldisiloxane. This chlorination results in the formation of a series of products. The monochloro derivative formed is monochlormethylpentamethyldisiloxane. Three dichloro derivatives are likewise formed. These derivatives are the dichloromethylpentamethyldisiloxane and symmetrical and unsymmetrical di(chlormethyl) tetramethyldisiloxane. Of these four chlorinated disiloxanes, the two which are of principal importance commercially are the monochloro derivative and the symmetrical dichloro derivative.

Objects of the present invention are to provide improved methods for the chlorination of hexamethyldisiloxane, and to provide methods for the chlorination of hexamethyldisiloxane in which the normal balance of chlorinated derivatives is shifted to give a high yield of the monochloro derivative.

In accordance with the present invention, hexamethyldisiloxane is chlorinated by continually charging hexamethyldisiloxane into a reaction zone. Chlorine is also charged continually into the reaction zone, but at a feed rate relative to the feed rate of hexamethyldisiloxane sufficiently low to maintain hexamethyldisiloxane in the reaction zone, continuously. This may be effected by feeding the chlorine in amount less than sufficient to form the monochloro derivative. Preferably less than 0.5 atom of chlorine per mol of hexamethyldisiloxane is fed into the reaction zone. Chlorinated hexamethyldisiloxane is continually removed from the reaction zone. The chlorinated product may be separated, if desired, from unreacted hexamethyldisiloxane. In case separation is effected, the separation may occur either in the reaction zone or in a separate zone from which hexamethyldisiloxane may be recycled to the reaction zone. By conducting the chlorination in accordance with the method stated, a remarkably high proportion of the monochloro derivative is obtained.

The process of the present invention may be conducted under widely varying conditions. Thus, the present process may be conducted as a liquid phase reaction, or it may be conducted in the vapor phase. The rate of the chlorination reaction may be accelerated by exposure of the reaction zone to light, preferably sunlight or any other source of high intensity light. A catalyst may be employed if desired.

The accompanying drawings are flow sheets which illustrate specific modes of operation of the process hereof. Fig. I is a flow sheet showing operation of the process hereof when conducted as a liquid phase reaction. Fig. II is a flow sheet showing operation of the process hereof when conducted as a vapor phase reaction.

In Fig. I, chlorinator 1 is connected to still 2 by line 3 to feed hexamethyldisiloxane from the still to the chlorinator, and by line 4 to feed chlorinated product from chlorinator 1 to still 2.

The still 2 is provided with an inlet 5 at its upper end for hexamethyldisiloxane. At a midpoint in the still there is a trap-out plate 6 to trap descending liquid phase hexamethyldisiloxane. In the zone of the still between inlet 5 and plate 6, there is provided a calandria 7, arranged with inlet and outlet connections, for cooling and condensing vaporized hexamethylsiloxane. The lower end of the still 2 is provided with a non-siphoning overflow 8 arranged to maintain a body of liquid in the lower end of the still. In the base of the still there is provided a steam coil 9 arranged to heat the contents of the lower end of the still whereby to distill off hexamethylsiloxane.

Line 3 connects with the trap-out plate 6 of still 2 to remove liquid phase hexamethyldisiloxane therefrom for introduction into the chlorinator. Line 4 enters still 2 at a point below the trap-out plate 6 and above the level of liquid in the lower part of still 2.

Chlorinator 1 is a column which is provided in its upper end with a calandria 10 to condense any hexamethyldisiloxane vapors from hydrogen chloride which is formed in the chlorinator and which leaves by outlet 11 at the upper end of chlorinator 1. Calandria 10 is provided with suitable inlet and outlet connections for coolant. A chlorine diffuser 12 is positioned in the lower end of chlorinator 1. Between the chlorine diffuser 12 and the liquid level 13 in the chlorinator, suitable lights 14 are provided in the wall of the chlorinator to accelerate the reaction as indicated.

The lower end of chlorinator 1, at a point below the chlorine diffuser connects with line 4, whereby chlorinated product is removed from the chlorinator. The chlorinator 1 and the still 2 are positioned at such relative levels that the inlet of line 4 into still 2 is at the liquid level desired in the chlorinator. Line 3 communicates with the chlorinator to deliver hexamethyldisiloxane thereto at a point below calandria 10 and above liquid level 13.

In operation the temperature of the chlorinator 1 is maintained at below the boiling point of hexamethyldisiloxane, the specific temperature depending upon the particular pressure employed. Temperature control of the chlorinator is effected primarily by control of heat exchange in calandria 7 and to a minor extent by control of heat exchange in calandria 10. The temperature in the base of still 2 is maintained at a temperature at or above the boiling point of hexamethyldisiloxane at the pressure employed. The temperature likewise should be below the boiling point of the lowest boiling chlorinated derivative, namely, of the monochloro derivative. As the boiling point of the hexamethyldisiloxane and its monochloro derivative differ substantially, no difficulty is encountered in making a clean separation between the two.

While pressure has been referred to, positive pressure above atmospheric is not necessary for the present reaction. Atmospheric pressure is very suitable and the reaction is quite rapid when suitable light or a catalyst is employed. However, if desired, positive pressure above atmospheric may be employed.

In the process as disclosed in Fig. II, the reactants are maintained in vapor phase in the chlorinator 20. The chlorinator communicates with a distillation column 21, which serves to separate the monochloro derivative from the small amount of bottoms which is obtained, and which is primarily polychloro derivative. The chlorinator 20 is provided with three zones. The top zone of the chlorinator is provided with a calandria 22 to condense hexamethyldisiloxane vapors rising in the chlorinator in mixture with hydrogen chloride. This top zone is separated from the reaction zone therebelow by a trap-out plate 23 for removing liquid phase hexamethyldisiloxane from the chlorinator. Spaced from the bottom of the chlorinator 20 there is positioned a plate 24, shaped to drain liquid from the reaction zone into the collector section of the chlorinator therebelow. An inlet 25 for hexamethyldisiloxane communicates with the reaction zone of the chlorinator 20 between the plates 23 and 24. The exact position of the inlet 25 is unimportant. A drain 26 from trap-out plate 23 is provided to remove liquid phase hexamethyldisiloxane. If desired, this liquid phase hexamethyldisiloxane may be recycled through vaporizer 27 and line 28 to the inlet line 25. Chlorine may be introduced by diffuser 29 into the reaction zone. Preferably the diffuser 29 is arranged to introduce the chlorine at a multitude of points dispersed throughout the reaction zone in order to prevent high local concentrations of chlorine. Suitable lights 30 are provided in the wall of the reaction zone of the chlorinator 20.

Fractionator 21 is of conventional construction. Line 31 communicates from the lower end of the chlorinator 20 to a mid-point in the fractionator. The level of the inlet into the fractionator is arranged to provide a body of fluid in the base of the chlorinator in order to prevent vapor phase communication of the chlorinator and the fractionating column.

In operation, the feed of hexamethyldisiloxane is sufficient to maintain an atmosphere of the disiloxane in the reaction zone. The chlorine which is introduced thereinto reacts rapidly therewith. While it would be possible to balance the operation and maintain the feed of hexamethyldisiloxane just sufficient that no more is introduced than is adequate to provide a continuous atmosphere thereof, in the reaction zone, the most efficacious manner of commercial operation involves feeding an excess thereof to chlorinator 20, whereby a portion of the hexamethyldisiloxane is condensed in calandria 22 and recycled through lines 26, 28 and 25.

The reaction zone is maintained at a temperature between the boiling point of hexamethyldisiloxane and of chlormethylpentamethyldisiloxane. Accordingly, upon the chlorination of any portion of the hexamethyldisiloxane, the chlorinated derivative will immediately condense and drop the plate 24 at the lower end of the chlorination zone and then drain into the body of liquid in the lower end of the chlorinator 20. The chlorinated product then flows from the body of liquid into the fractionator in which the monochloro derivative is separated from the polychloro derivatives.

The following chlorination is illustrative of the present invention.

Hexamethyl disiloxane was fed into the top of a reaction zone, and chlorine gas was fed into the reaction zone countercurrent to the flow of hexamethyldisiloxane. The chlorine was fed at such a rate that less than 0.5 atom of chlorine was added per mol of hexamethyldisiloxane. The product was continually removed from the zone and fed into the stripping zone. The stripping zone was maintained at a temperature sufficient to distill off the unreacted hexamethyldisiloxane, which boils at 100° C., and insufficient to distill off the monochlormethylpentamethyldisiloxane. The temperature range between these two is about 50° C. The stripping zone was maintained at atmospheric pressure. The hexamethyldisiloxane distillate was condensed and returned to the reaction zone. A distillation analysis of the bottoms products obtained from the stripping zone is as follows:

| Product | Per Cent by Volume |
|---|---|
| $[(CH_3)_3Si]_2O$ | 24.4 |
| $CH_2Cl(CH_3)_2SiOSi(CH_3)_3$ | 53.8 |
| Bottoms | 21.8 |
| Total | 100.0 |

That which is claimed is:

1. The method of preparing chloromethylpentamethyldisiloxane which comprises continually charging hexamethyldisiloxane into a reaction zone, continually charging chlorine into said reaction zone in amount less than sufficient to form the monochloro derivative of the hexamethyldisiloxane, whereby hexamethyldisiloxane is maintained in the reaction zone continuously, and whereby the hexamethyldisiloxane is chlorinated, and continually removing chlorinated hexamethyldisiloxane from the reaction zone.

2. The method of preparing chloromethylpentamethyldisiloxane which comprises continually charging hexamethyldisiloxane into a reaction zone, continually charging chlorine into said reaction zone in amount less than sufficient to form the monochloro derivative of the hexamethyldisiloxane, whereby hexamethyldisiloxane is maintained in the reaction zone continuously, and whereby the hexamethyldisiloxane is chlorinated, maintaining the temperature in the reaction zone below the boiling point of hexamethyldisiloxane, and continually removing hexamethyldisiloxane and chlorinated hexamethyldisiloxane from the reaction zone.

3. The method of preparing chloromethylpentamethyldisiloxane which comprises continually charging hexamethyldisiloxane into a reaction zone, continually charging chlorine into said reaction zone in amount less than sufficient to form the monochloro derivative of the hexamethyldisiloxane, whereby hexamethyldisiloxane is maintained in the reaction zone continuously and whereby the hexamethyldisiloxane is chlorinated, maintaining the temperature of the reaction zone between the boiling points of the hexamethyldisiloxane and of the monochloro derivative, whereby the monochloro derivative condenses upon formation, withdrawing unreacted hexamethyldisiloxane from the reaction zone and separately continually removing chlorinated hexamethyldisiloxane from the reaction zone.

JOHN LEOPOLD SPEIER, Jr.

REFERENCES CITED

The following references are of record in the file of this patent:

UNITED STATES PATENTS

| Number | Name | Date |
|---|---|---|
| 1,623,018 | Cross | Mar. 29, 1927 |
| 2,348,072 | Bailey | Feb. 15, 1944 |
| 2,384,384 | McGregor | Sept. 4, 1945 |
| 2,386,441 | Daudt | Oct. 9, 1945 |

OTHER REFERENCES

Krieble, "Jour. Amer. Chem. Soc.," vol. 67 (1945), pages 1810–1812.

Whitmore, "Jour. Amer. Chem. Soc.," vol. 68 (1946), pages 481–484.

Krieble et al., "Jour. Am. Chem. Soc.," vol. 68, pages 2291–2294.

Certificate of Correction

Patent No. 2,510,148                                June 6, 1950

JOHN LEOPOLD SPEIER, Jr.

It is hereby certified that error appears in the printed specification of the above numbered patent requiring correction as follows:

Column 2, line 22 and lines 28 and 29, respectively, for "hexamethylsiloxane" read *hexamethyldisiloxane*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*